May 18, 1948.  P. C. SMITH ET AL  2,441,850
APPARATUS FOR STEREOSCOPIC WORK
Original Filed Jan. 27, 1945
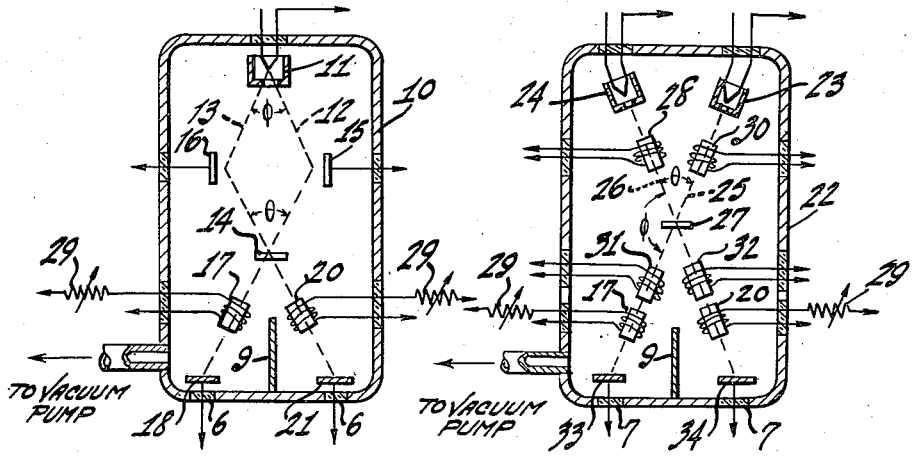
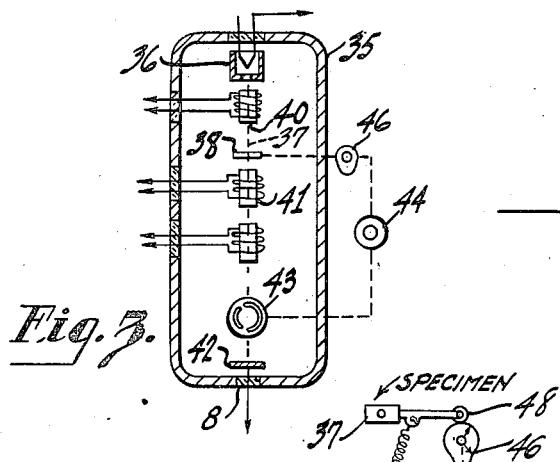
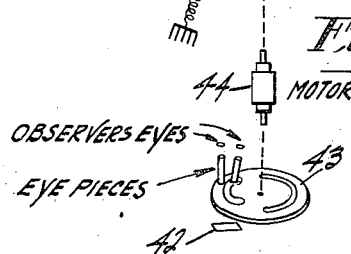
Inventors
Perry C. Smith
& Frank E. Runge
By
Attorney Patented May 18, 1948

2,441,850

UNITED STATES PATENT OFFICE 2,441,850

APPARATUS FOR STEREOSCOPIC WORK

Perry C. Smith, Moorestown, N. J., and Frank E. Runge, Branford, Conn., assignors to Radio Corporation of America, a corporation of Delaware Original application January 27, 1945, Serial No. 574,864. Divided and this application November 27, 1946, Serial No. 712,576

8 Claims. (Cl. 250—49.5)

The present invention relates to the production of stereoscopic images and more particularly to such images for viewing and photographing in electron microscopes, and this application for patent thereon is a division of application Serial No. 574,864, filed January 27, 1945, now Patent No. 2,436,676, granted February 24, 1948.

In the use of electron microscopes, it has been possible heretofore to obtain stereoscopic effects by taking pictures of a specimen from different angles, developing the pictures and then examining them by a stereoscopic aid. In such method, it is impossible to select what may be the most valuable area to be examined and studied, so that much time is lost in taking sets of pictures from different angles to ensure the best possible analysis of the specimen.

Some of the objects of the present invention are: to provide a novel apparatus for producing stereoscopic images; to provide an apparatus for viewing electron microscope specimens in three dimensions; to provide an apparatus for producing three dimensional images capable of being photographed; to provide an apparatus wherein electron microscope specimens can be viewed in three dimensions produced from different angles whereby the area of a specimen can be surveyed so that the most valuable area for study can be photographed; to provide an apparatus for producing three dimension images and by means of which the number of photographs of such images can be reduced to a minimum; and to provide other improvements as will hereinafter appear.

In the accompanying drawings, Fig. 1 represents diagrammatically a system for producing stereoscopic images embodying one form of the present invention; Fig. 2 represents diagrammatically a system embodying a modified form of the invention; Fig. 3 represents diagrammatically a system embodying another form of the invention; Fig. 4 is a graph representing time of viewing allowed by the system of Fig. 3; and Fig. 5 represents a detailed schematic view, partly in perspective of the viewing used in connection with the device of Fig. 3.

Referring to Fig. 1 of the drawings, one form of the invention comprises an evacuated chamber 10, such, for example, as the column of an electron microscope, wherein a cathode and anode system 11 of an electron gun or cathode ray tube is arranged to split the electron beam into two diverging beams 12 and 13 separated by the angle $\phi$.

For directing the beams 12 and 13 upon a specimen 14, two adjustable elements of electrodes 15 and 16 are located respectively adjacent the beams 12 and 13, and are so positioned as to cause each beam to be directed upon the same portion of the specimen but from different angles of approach. As shown, the two beams converge upon the specimen to form the aspect angle $\theta$, but this angle can be varied according to conditions and for various techniques by moving the specimen 14 nearer to or further away from the anode-cathode system 11, while at the same time adjusting the potential applied to the electrodes 15 and 16.

In order that two images corresponding respectively to the two beam aspects of the specimen can be produced for viewing or photographing, the beam 12 is caused to traverse a focussing and magnifying lens system 17, which directs the aspect of beam 12 upon a fluorescent screen 18, while the beam 13 is caused to traverse a focussing and magnifying system 20, which directs the aspect of beam 13 upon a fluorescent screen 21. The two screens 18 and 21 are mounted preferably in the same plane and spaced apart so that one eye of an observer is opposite the screen 18 and the other eye opposite the screen 21. It will be understood that transparent sight openings 6 are formed in the wall of chamber 10 respectively alined with the screens 18 and 21. While some observers can, by concentration or experience, get stereoscopic perception without the aid of separate lenses for their right and left eyes or a screen between the lines of sight from the right eye and from the left eye to the object, a screen 9 may be included. The screen 9 is to be located between the screens 18 and 21 parallel to the lines of eyesight and equidistant from each.

The coating of the screens is preferably such as to have a relatively short persistence characteristic. When the two images are simultaneously viewed by the observer, the composite result is a three dimension image. While for purposes of disclosure two screens are described, it is to be understood that in practice a single screen will probably be used of a size to permit both images to appear thereon in proper relation for simultaneous viewing. Thus, in the appended claims, where two fluorescent areas are mentioned, such phraseology is to be broadly interpreted as meaning two distinct screens or a single screen of such size as will present two areas of fluorescence to two respective beams.

In the form of the invention shown in Fig. 2, the chamber 22, which is part of a vacuum system, is provided with two independent electron beam systems 23 and 24 which respectively project electron beams 25 and 26 upon the specimen 27, the said beams converging at a fixed selected angle $\theta$ in order to produce optimum visual effects. The beam 25 traverses a condensing lens 28 and the beam 26 traverses a condensing lens 30, so that each beam strikes the same specimen area at a different angle. After converging upon the specimen, the two beams continue (each upon its projected path) in diverging relation to traverse respectively two focussing and magnifying lens systems 31 and 32 for directing respectively the two aspects upon two fluorescent screens 33 and 34, where the two images can be simultaneously viewed as heretofore explained. This viewing is made possible by transparent sight openings 7 formed in the wall of the chamber 22 respectively alined with the screens 33 and 34. It should be noted that the specimen may be swung through angle $\phi$ so that larger or smaller angles than allowed by angle $\theta$ can be obtained.

In the forms of the invention shown in Figs. 1 and 2, it is preferable to include a variable resistance 29 in the circuit of the lenses 17 and 20, particularly in the case of Fig. 2, for the purpose of restoring the position of the images to the same relation as viewed by the beams, as otherwise a distorted stereoscopic effect would result due to the rotational effect of the beam.

In the form of invention shown in Fig. 3, the vacuum chamber 35 has a single anode and cathode system 36 therein arranged to project an electron beam 37 upon a specimen 38 by means of a condensing lens 40. From the specimen 38 the beam traverses a focussing and magnifying lens system 41 which in turn directs the image of the area covered by the beam upon a fluorescent screen 42.

In order to obtain a stereoscopic effect, a rotatable shutter or chopper 43 is arranged between the observer's eyes and the images which are alternately applied to the fluorescent screen 42 as shown in Fig. 5. The slits in the rotating chopper alternately expose the images to the eyes of the observer in synchronism with the applications of the electron beam to the specimen. The specimen 38, in this instance, is mounted for rocking by means including the cam 46 and cam follower 48 which are under control of a motor system 44 which also is arranged to rotate the shutter 43. Thus, the control 44 can rock the specimen through the angle $\phi$ and at the same time synchronously rotate the shutter or chopper 43. As the specimen is rocked to the right, or position for the right eye image, the shutter 43 shuts off the vision from the left eye of the observer but allows the right eye to see one aspect on the screen 42. When the specimen is rocked to the left, or position for the left eye image, the shutter 43 allows the left eye only to see the different aspect on the screen 42. This viewing of the screen is made possible by a transparent sight opening 8 formed in the wall of the chamber in alinement with the screen 42. In Fig. 4 Y represents the time of viewing allowed by the shutter or chopper for each eye, while X represents time in which fluorescent screen 42 must decay to a negligible amount. The motion of the specimen, however, should be as nearly square wave as shown in Fig. 4. Thus, it will be seen that by viewing the two aspects alternately with the left and right eyes of the observer the resultant image appears in three dimensions.

We claim as our invention:

1. A system for producing stereoscopic images, an evacuated chamber, a fluorescent screen, means in said chamber including at least one electron beam for producing on said screen two images respectively formed by different angular projections of said beam means upon a specimen, said images appearing in the same area on said screen, means for alternating the appearance of said images, and means for viewing said screen from the outside of said chamber.

2. A system for producing stereoscopic images, comprising an evacuated chamber, a fluorescent screen, a source of projected electrons in said chamber, means for supporting a specimen between said screen and said source, means to vary the angle between said electrons and said specimen to obtain two projected images of said specimen from different angles, means to focus said images one at a time upon said screen, and means for viewing said screen from outside of said chamber.

3. A system for producing stereoscopic images, comprising an evacuated chamber, a fluorescent screen, means in said chamber including an anode and cathode forming a source of an electron beam, means between said screen and said source for mounting a specimen, means for varying the angle between said beam and said specimen mounting means, a shutter between said screen and said specimen, means for simultaneously rocking said specimen and operating said shutter whereby two images corresponding respectively to two angular positions of said specimens are alternately projected upon the screen, and means for viewing said screen from outside of said chamber.

4. A system for producing stereoscopic images, comprising an evacuated chamber, a fluorescent screen, means in said chamber including an anode and a cathode forming a source of an electron beam, means between said screen and said source for mounting a specimen, means for varying the angle between said beam and specimen mounting means, means for moving said specimen to project said beam upon two different positions of said specimen to produce two images upon said screen alternately, means to cause one image to be seen upon the screen by one eye of an observer and the other image by the other eye of the observer, and means for viewing said screen from the outside of said chamber.

5. A system for producing stereoscopic images, comprising a fluorescent screen, a source of projected electrons, means for supporting a specimen between said screen and said source in the path of an electron beam, means forming an evacuated chamber enclosing said screen, source and specimen, said chamber having a viewing opening alined with said screen, means including a lens system to vary the angle between said beam and said specimen to obtain two projected images of said specimen from different angles, and means to focus said images one at a time upon said screen.

6. A system for producing stereoscopic images, comprising a fluorescent screen, a source of projected electrons, means for supporting a specimen between said screen and said source in the path of an electron beam, means forming an evacuated chamber enclosing said screen, source and specimen, said chamber having a viewing opening alined with said screen, means to vary the angle between said beam and said specimen to obtain two projected images of said specimen from different angles, and means including a magnifying lens system to focus said images one at a time upon said screen.

7. A system for producing stereoscopic images, comprising a fluorescent screen, a source of projected electrons, means for supporting a specimen between said screen and said source in the path of an electron beam, means forming an evacuated chamber enclosing said screen, source and specimen, said chamber having a viewing opening alined with said screen, means to vary the angle between said beam and said specimen to obtain two projected images of said specimen from different angles, and means to focus said images one at a time upon said screen.

8. A system for producing stereoscopic images, comprising a fluorescent screen, a source of projected electrons, means for supporting a specimen between said screen and said source in the path of an electron beam, means forming an evacuated chamber enclosing said screen, source and specimen, said chamber having a viewing opening alined with said screen, means including a lens system to vary the angle between said beam and said specimen to obtain two projected images of said specimen from different angles, and means including a magnifying lens system to focus said images one at a time upon said screen.

PERRY C. SMITH.
FRANK E. RUNGE.